Patented Feb. 19, 1952

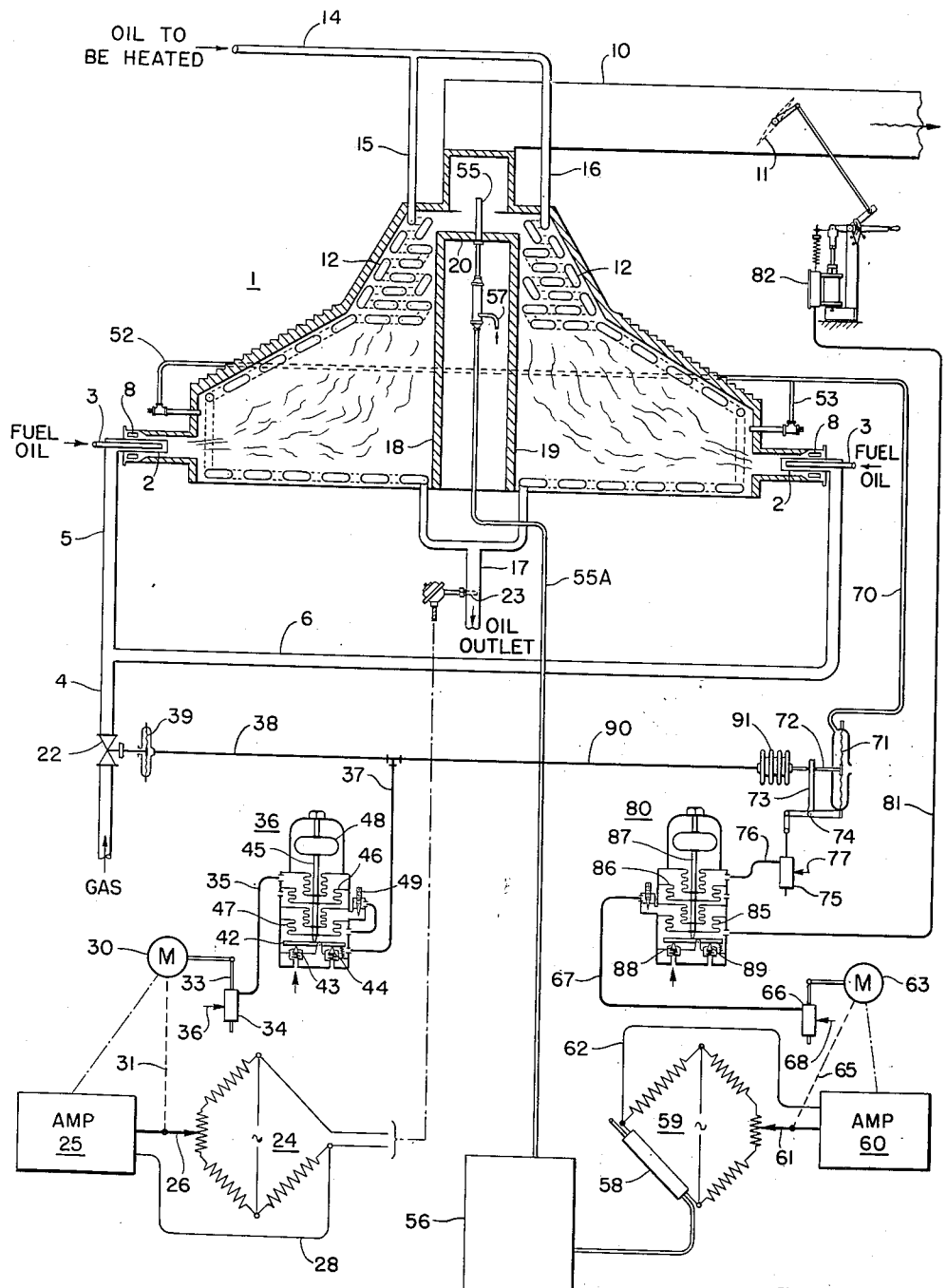

2,586,503

UNITED STATES PATENT OFFICE 2,586,503

FLUID HEATER TEMPERATURE CONTROL SYSTEM

Clayton H. Barnard, Cleveland, Ohio, assignor to Bailey Meter Company, a corporation of Delaware Application January 29, 1948, Serial No. 5,071

7 Claims. (Cl. 236—15)

This invention relates to heater control systems, and more particularly to systems for controlling combustion in a heater so as to maintain the temperature of a heated medium at a predetermined value.

To maintain the temperature of a heated medium at a predetermined value it is necessary that combustion control means for the heater be made responsive to conditions which indicate changes in its operation and which, if not corrected, will in time result in a change in the temperature of the medium. The system should also be responsive to changes in the temperature of the heated medium so that any variation from the desired value will also effect a change in operation of the heater to return the temperature to the desired value.

When most efficient combustion of the fuel takes place in the heater there may be obtained for a given fuel supply, a heating of the medium to the desired temperature. The draft through the furnace to produce most efficient combustion with the given fuel supply may be readily determined. It will be appreciated that any variation in the draft from the value determined will result in a more inefficient combustion and, if this is permitted to continue, there will be in time a drop in temperature of the material or medium heated. Even though the supply of fuel may be constant, there may be some variation in the quality of the fuel so that a change in the draft is needed to continue operation of the heater at maximum efficiency. In a preferred form of my invention there may be provided means responsive to pressure in the heater as an indication of draft; means responsive to the oxygen content in the flue gases as an indication of combustion, and means adapted to be actuated by either one or both of said means for controlling the position of a draft regulating damper. There may also be included means responsive to the temperature of the heated material or medium for regulating the supply of fuel and providing a further control of the damper operating means.

An object of my invention is to provide an improved control system for a heater. Another object is to provide an improved system for regulating the operation of a heater so as to maintain the temperature of a material or medium heated thereby at a constant value. Yet another object is to provide a system which operates to control the draft in a heater in response to measurements of the draft and the oxygen content of the flue gases. Still another object is to provide a system that operates to control the draft of the heater in response to changes in the temperature of a medium heated, and in response to changes in the oxygen content of the flue gas and the pressure in the heater.

Other objects will become apparent in the course of the following description.

In the drawing, the single figure shows a heater having my improved control system associated therewith.

Referring to the drawing it will be noted that there is shown a heater 1 having fuel supplied thereto through nozzles 2 located at opposite points in the side walls. It will be appreciated that other nozzles may be located at different points about the heater, if needed. As shown herein, fuel oil is supplied to each of the nozzles through a conduit 3, and gas is conducted from a conduit 4 through branch conduits 5 and 6 to spaces in the nozzles surrounding the ends of the conduits. At each of the nozzles are passage means 8 supplying air to the interior of the heater for supporting combustion of the oil and/or gas, and the combustion gases are discharged from the heater through a stack 10 under the control of a damper 11.

The heater shown herein is designed especially for heating oil during its refining process. Extending along opposite walls of the heater are conduits 12 connected at their ends in series, and an oil supply conduit 14 is connected in parallel paths through branch conduits 15, 16 and the series connected conduits to a discharge conduit 17 at the lower end of the heater. Projecting upwardly from the bottom of the heater, midway between the nozzles 2, is a baffle having spaced side walls 18, 19 which are joined at their upper ends by a wall 20. The flames from the nozzles are directed by the baffle over the conduits 12 to the stack 10 which communicates with the heater at a point above the baffle.

Oil is an example of a non-homogeneous effluent, because when heated it has a varying content of liquid, vapor and gases.

For controlling the supply of fuel to the heater, there is provided a valve device 22 in the gas supply conduit 4. Arranged in the discharge conduit 17 is an element 23 varying in resistance in response to changes in the temperature of the heated oil, and a bridge network 24 includes the element 23 in one of its legs so that it may be unbalanced on variations in oil temperature. An amplifier and motor control device 25, which may be like that disclosed in the Ryder Patent 2,275,317, granted March 3, 1942, is connected to an adjustable bridge contact 26 and to a diagonally opposite point on the bridge by a conductor 28. A motor 30 is connected to the control device 25 to be energized by the latter for operation in one direction or the other depending upon the direction of the bridge unbalance. Operative connections between the motor and the contact 26 provide for an adjustment of the latter by the motor to restore the bridge to a balanced condition. The motor 30 is also connected to the valve stem 33 of a pilot valve 34 for controlling communication of a conduit 35 with the atmosphere and with a pressure fluid supply 36. This pilot valve is like that disclosed in the Johnson Patent 2,054,464, issued September 15, 1936, and needs no further description herein. It is sufficient to say that an upward movement of the valve stem results in a pressure increase in the conduit 35, while a downward movement of the valve stem produces a drop in the pressure in conduit 35. A relay 36 receives fluid pressure from the conduit 35 and operates on a variation of the pressure from a predetermined value to supply fluid at a continuously increasing or decreasing pressure through conduits 37 and 38 to a diaphragm 39 for positioning the valve 22.

The relay 36 comprises a pivoted beam 42 which is operative to control a fluid supply valve 43 and a fluid exhaust valve 44. A rod 45 acts upon the beam and is connected to diaphragms 46, 47, and a manually adjustable spring 48. The pressure fluid supplied by the conduit 35 acts on the diaphragm 46 for forcing the rod against the beam to open the supply valve 43, and the pressure supplied to the conduit 37 also acts on the lower side of the diaphragm 47 for urging the rod away from the pivoted beam. The opposite sides of the diaphragm 47 are connected in communication with each other past a restricting valve 49 so that the pressure at the upper side of the diaphragm changes in the same direction as the pressure at the lower side but at a reduced rate. This relay is disclosed in the Patent Re. 21,804, issued to Gorrie on May 20, 1941, and further description is believed to be unnecessary.

When the temperature of the oil in the conduit 17 is at the desired value and the bridge 24 is balanced, the relay 36 supplies fluid pressure to the diaphragm 39 for holding the valve 22 in a position to supply gas to the burner at a rate which should maintain the desired temperature of the oil. If the oil temperature increases for some reason, the bridge 24 becomes unbalanced and effects operation of the motor 30 in a direction to decrease the pressure supplied from the pilot valve to the relay 36. The motor positions the contact 26 at the same time to restore the balance of the bridge. The decreased pressure acting on the diaphragm 46 results in an upward movement of the rod 42 to permit a closing of the supply valve 43 until the pressure at the lower side of the diaphragm 47 drops to a value at which the relay is balanced. This reduced pressure acting on the diaphragm 39 results in a closing of the valve 22 to reduce the supply of gas to the heater. Pressure at the upper side of the diaphragm 47 passes slowly by the valve 49 to the lower side of this diaphragm and causes a continued unbalance to reduce the pressure supplied to the diaphragm 39 until the oil temperature is returned to the desired value, or until the valve 22 is fully closed. A drop in the oil temperature below the desired value results in operation of the relay to increase the pressure on diaphragm 39 for opening the valve 22 until the temperature increases again to the desired value, or until the valve is in its full open position.

By providing means responsive to conditions in the heater that would result in a change in the oil temperature if permitted to continue, it is possible to regulate the operation of the heater by such means so as to prevent in most cases any substantial change in the oil temperature. It will be appreciated that changes in the oxygen content of the gases supplied from the heater to the stack 10 indicate that changes have taken place in the ratio of the fuel and air supply to the heater. This may be due to changes in the draft, the fuel supply, the quality of the fuel, or a combination of them all. Any change in the draft may be detected immediately by providing conduits 52 and 53 communicating with the interior of the heater at points adjacent the nozzles 2. A drop in the pressure at these points indicates an increase in the draft, and an increase in the pressure indicates a reduced draft. If a determination is made of the draft required to maintain the combustion giving the greatest amount of heat for the fuel supplied, then it will be seen that either an increase or decrease in the draft from this value will result in a reduction of the heat obtained. If the oxygen content of the combustion gases is determined when the combustion is such that the maximum heat is obtained for the fuel supplied, then any variation of the oxygen content from this value will indicate a change in the heater operation to give less heat.

To determine the oxygen content of the combustion gases, there is provided a device 55 extending through the baffle wall 20 to a point adjacent the entrance to the stack 10 for taking a sample of the gases and delivering it to an analyzer 56. A conduit 57 discharges water through the pipe 55A for producing a suction which pulls the gas sample into the analyzer 56. The sample is first separated from the water, then mixed at the analyzer with a fuel, and then burned on an element forming a leg 58 of a bridge 59 and varying in resistance as its temperature changes. An amplifier and motor control device 60, similar to the device 25, is connected to an adjustable contact 61 for the bridge 59, and is connected by a conductor 62 to a diagonally opposite point of the bridge. A motor 63 is energized by the device 60 when the bridge is unbalanced, and operative connections 65 are provided between the motor and the contact 61 for positioning the latter to rebalance the bridge. The motor is also connected to the stem of a pilot valve 66 for controlling the connection of a conduit 67 in communication with the atmosphere or with a fluid supply 68.

When the combustion in the heater is such that maximum heat is obtained from the fuel supplied, there is usually a small amount of excess oxygen which is carried with the other gases of combustion to the stack 10. The sample gas including a portion of this oxygen is supplied to the analyzer 56 where it is mixed with fuel and then burned on the element forming the leg 58 of the bridge 59. As long as the amount of oxygen in the flue gas remains constant, the element forming the bridge leg 58 will be heated to a predetermined temperature. The bridge contact 61 will be positioned by the motor to balance the bridge 59, and the pilot valve 66 will be adjusted to maintain a predetermined pressure in the conduit 67. If the draft increases or the supply of fuel to the heater decreases, the oxygen content of the flue gas increases and causes an increase in the resistance of the bridge leg 58 to unbalance the bridge. The motor 63 then operates to position the contact 61 for rebalancing the bridge and to adjust the pilot valve 66 for decreasing the pressure in the conduit 67. A decrease in the draft or an increase in the fuel supply results in a reduction of the excess oxygen and an unbalance of the bridge 59 to effect an operation of the motor 63 for increasing the pressure in the conduit 67.

The pressure in the heater at the ends of the conduits 52 and 53 is effective through a conduit 70 to one side of a diaphragm 71 which is subjected on its other side to atmospheric pressure. The diaphragm carries a member 72 acting on one leg of a bell crank lever 73 which is pivotally supported at 74, and the other leg of the lever is connected to a pilot valve 75 which controls communication of a conduit 76 with the atmosphere and with a fluid supply 77. The arrangement is such that a pressure drop in the conduit 70 as a result of an increased draft causes the diaphragm 71 to adjust the pilot valve 75 for reducing the pressure in the conduit 76.

It will be seen that a change in the draft through the heater causes the pressures in conduits 67 and 76 to change in the same direction. The change will take place first in the conduit 76, but it will be followed soon by the operation of the analyzer to unbalance the bridge 59 and effect an operation of the motor 63 to position the pilot valve 66 for changing the pressure in the conduit 67. A relay 80 is provided for supplying pressure through a conduit 81 to a mechanism 82 to position the damper 11 in response to changes in pressure in the conduits 67 and 76. This relay includes diaphragms 85 and 86 subjected on their upper sides to the pressures in the conduits 67 and 76, respectively. A member 87 is connected to the diaphragms and acts on a pivoted beam for positioning a supply valve 88 and an exhaust valve 89 to control the pressure in the conduit 81. The pressure supplied to the conduit 81 also acts on the lower side of the diaphragm 85 to oppose the action of the pressures on the upper sides of the diaphragms 85 and 86.

As the draft increases, the pressure in the conduit 76 decreases immediately so that the member 87 moves upwardly to permit a closing movement of the valve 88 for reducing the pressure supplied to the conduit 81. The mechanism 82 then operates under the reduced pressure to move the damper 11 toward its closed position. Any increase in the oxygen content of the combustion gases as a result of the increased draft will cause the analyzer 56 to unbalance the bridge 59 and effect an operation of the motor 63 to decrease the pressure in the conduit 67. This pressure acting on the diaphragm 85 will cause the relay member 87 to move upwardly and decrease the pressure supplied to the conduit 81 for effecting a closing movement of the damper 11. If the draft remains constant and the fuel supply changes, the change will be detected by the measurement of the oxygen in the flue gases, and the relay 80 will be caused to operate for regulating the pressure acting on the damper actuating mechanism 82. For every change in the operation of the heater there will be a positioning of the damper to restore conditions giving the highest operating efficiency.

In order that changes in the temperature of the heated oil may also determine the positioning of the damper, there is provided a conduit 90 for supplying pressure from the conduit 31 to a bellows 91 acting on the bell crank 73 opposite the diaphragm 71. As explained above, an increase in oil temperature results in a pressure drop in the conduit 31 so that the valve 22 moves toward its closed position. This same pressure acting on the bellows 91 permits the bell crank 73 to move in a counterclockwise direction for reducing the pressure supplied to the relay 80 through the conduit 76. The relay then operates to reduce the pressure in the conduit 81 so that the mechanism 82 operates to move the damper 11 toward its closed position. A drop in the oil temperature will result in an opening of the valve 22 and an opening of the damper 11.

While there is described in this application one form which my invention may assume in practice, it will be understood that it may be modified and embodied in various other forms without departing from its spirit or the scope of the appended claims.

What I claim as new and desire to secure by United States Letters Patent, is:

1. A control system for controlling the operation of a heater to maintain the temperature of a medium heated thereby at a constant value comprising, in combination, means operating in response to the temperature of the heated medium for producing a first control pressure, valve means responsive to said control pressure for controlling the supply of fuel to the heater, differential pressure means responsive to said first control pressure and to the pressure in said heater for producing a second control pressure, means for measuring the oxygen content of the combustion gases, means controlled by said measuring means for producing a third control pressure, a relay responsive to said second and third control pressures for producing a fourth control pressure, and means responsive to said fourth control pressure for controlling the draft through the heater.

2. A system for controlling the operation of a confined tubular heater to maintain the temperature of a vaporous liquid effluent heated thereby at a constant value comprising, in combination, means operating in response to the said effluent temperature for producing a first control pressure, suspended fuel burner means for said heater, valve means responsive to said first control pressure for controlling the supply of fuel to the heater, differential pressure means responsive to said first control pressure and to the draft through the heater for producing a second control pressure, means including a continuously operable analyzer for measuring the oxygen content of the gases of combustion, means controlled by said measuring means for producing a third control pressure, relay means responsive to the said second and third control pressures for producing a fourth control pressure, and means responsive to said fourth control pressure for controlling the draft through the heater.

3. A control system for controlling the operation of a heater to maintain the effluent temperature of a non-homogeneous medium heated thereby at a constant value comprising, in combination, means operating in response to the temperature of the heated medium for producing a first control effect, means responsive to said control effect for controlling the supply of fuel to the heater, differential means responsive to said first control effect and to the pressure in said heater for producing a second control effect, means for measuring the oxygen content of the combustion gases, means controlled by said measuring means for producing a third control effect, means responsive to said second and third control effects for producing a fourth control effect, and means responsive to said fourth control effect for controlling the draft through the heater.

4. A system for controlling the operation of a confined tubular heater to maintain the temperature of a non-homogeneous composition vaporous liquid effluent material heated thereby at a constant value comprising, in combination, means operating in response to the effluent temperature of said material for producing a first control effect, suspended fuel burner means for said heater, means responsive to said first control effect for controlling the supply of fuel to the burner means, differential means responsive to said first control effect and to the draft through the heater for producing a second control effect, means including a continuously operable analyzer for measuring the oxygen content of the gases of combustion, means controlled by said measuring means for producing a third control effect, means responsive to the said second and third control effects for producing a fourth control effect, and means responsive to said fourth control effect for controlling the draft through the heater.

5. A system for controlling the operation of a heater to maintain the temperature of a medium heated thereby at a constant value comprising, in combination, means for measuring the temperature of the heated medium, means for regulating the supply of fuel to the heater, means for measuring the draft through the heater, means for regulating the draft through the heater, means for measuring the oxygen content of the gases of combustion, means jointly responsive to said temperature measuring means and said draft measuring means operating said fuel supply regulating means, and means responsive to said oxygen measuring means and to said jointly responsive means operating said draft regulating means.

6. A system for controlling the operation of a heater to maintain the temperature of a non-homogeneous liquid medium heated thereby at a constant value comprising, in combination, means responsive to the effluent temperature of the heated medium, means responsive to the draft through the heater, means for supplying fuel to the heater, means jointly controlled by the temperature responsive means and the draft responsive means for regulating said fuel supplying means, means responsive to the oxygen content of the gases of combustion, means for regulating the draft through the heater, and means operated by the oxygen responsive means and said jointly controlled means actuating said draft regulating means.

7. A system for controlling the operation of a heater having a confined tubular conduit to maintain the temperature of a non-homogeneous composition vaporous liquid effluent material heated thereby in said conduit at a constant value comprising, in combination, means responsive to the effluent temperature of said material, suspended-fuel burner means for said heater, means for supplying fuel to the burner means, means responsive to the draft through the heater, means responsive to the oxygen content of the gases of combustion, means for controlling the draft through the heater, means jointly controlled by the temperature responsive means and the draft responsive means regulating said fuel supplying means, and means operated by said jointly controlled means and said oxygen responsive means actuating the draft regulating means.

CLAYTON H. BARNARD.

REFERENCES CITED

The following references are of record in the file of this patent:

UNITED STATES PATENTS

| Number | Name | Date |
|---|---|---|
| 1,962,676 | Albright | June 12, 1934 |
| 1,967,988 | Dickey | July 24, 1934 |
| 2,052,375 | Wunsch et al. | Aug. 25, 1936 |
| 2,298,257 | Reaser | Oct. 6, 1942 |
| 2,353,692 | Cunningham | July 18, 1944 |
| 2,468,535 | Anderson | Apr. 26, 1949 |

FOREIGN PATENTS

| Number | Country | Date |
|---|---|---|
| 627,448 | Germany | Mar. 16, 1936 |

OTHER REFERENCES

Ziebolz, "Analysis and Design of Translator Chains," volume 1, Text, pages 183 through 187. Volume II, Diagrams, Figures 269 and 274 (two sheets). Published September 25, 1946, by Askania Regulator Company.